United States Patent [19]

Rossmann et al.

[11] Patent Number: 4,477,286

[45] Date of Patent: Oct. 16, 1984

[54] BREAKING OIL-IN-WATER EMULSIONS

[75] Inventors: Christian Rossmann, Langenfeld; Wolfgang Riedel, Düsseldorf, both of Fed. Rep. of Germany

[73] Assignee: Henkel Kommanditgesellschaft auf Aktien, Düsseldorf-Holthausen, Fed. Rep. of Germany

[21] Appl. No.: 399,790

[22] Filed: Jul. 19, 1982

[30] Foreign Application Priority Data

Mar. 6, 1982 [DE] Fed. Rep. of Germany ....... 3208130

[51] Int. Cl.³ .......................... C23G 1/36; B01D 17/04
[52] U.S. Cl. .......................................... 134/10; 134/40; 210/708; 252/331; 252/358
[58] Field of Search ................. 252/331, 358; 210/708; 134/10, 40

[56] References Cited

U.S. PATENT DOCUMENTS

| | | | |
|---|---|---|---|
| 1,980,118 | 11/1934 | Tyler | 252/331 |
| 2,711,978 | 6/1955 | Groom | 134/10 |
| 3,819,522 | 6/1974 | Zmoda et al. | 252/89 |
| 4,082,867 | 4/1978 | Henley et al. | 134/40 |
| 4,153,545 | 5/1979 | Zwack et al. | 210/23 F |
| 4,321,146 | 3/1982 | McCoy et al. | 210/708 |

OTHER PUBLICATIONS

"Chemical Abstracts", 1982, vol. 97 (2), 7429h.
"Chemical Abstracts", 1983, vol. 98 (8), 55626n.
"Encyclopedia of Chemical Technology", Kirk-Othmer, Wiley (1980), vol. 22, 3rd Edition, p. 335.
Chemical Abstracts, vol. 95 (1981), p. 585, 124007p, p. 77, 221345e.

Primary Examiner—S. Leon Bashore
Assistant Examiner—K. M. Hastings
Attorney, Agent, or Firm—Hammond & Littell, Weissenberger & Dippert

[57] ABSTRACT

The invention relates to the use of 2,4,7,9-tetramethyl-5-decyne-4,7-diol for breaking oil-in-water emulsions and in regenerating used cleaning compositions by making it possible to remove emulsified oils therefrom.

9 Claims, 1 Drawing Figure

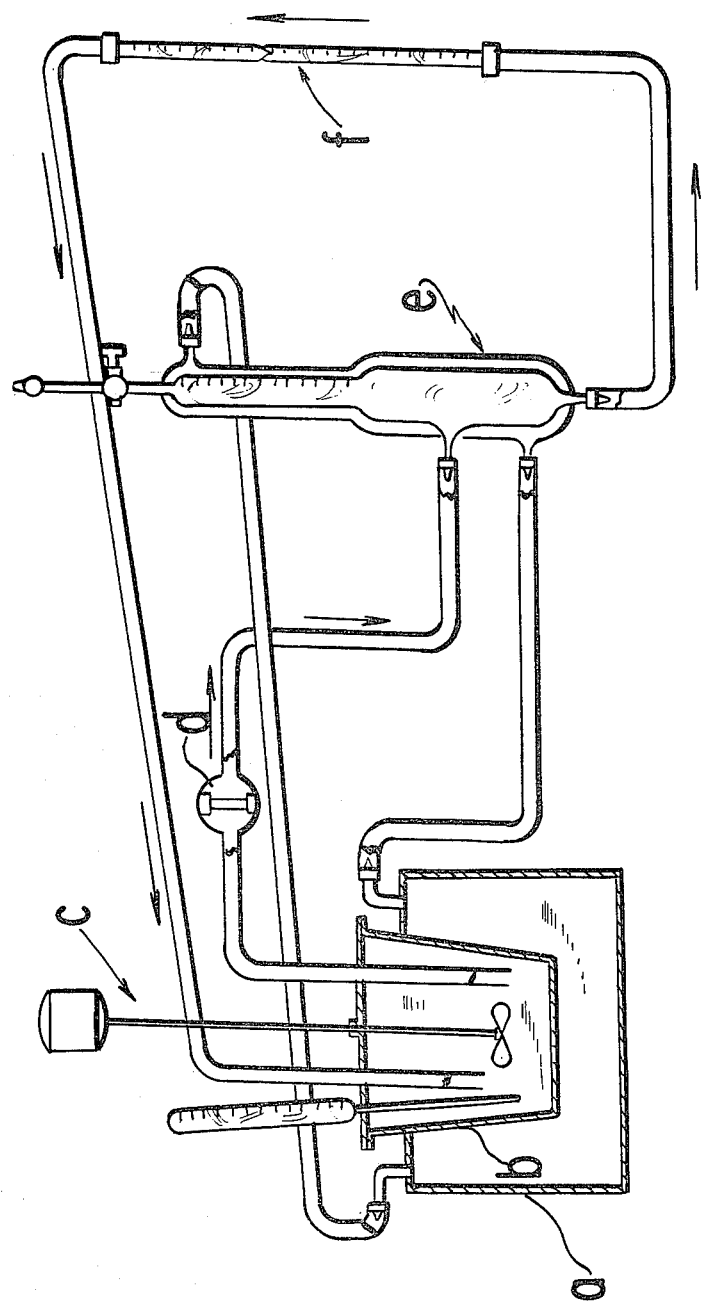

BREAKING OIL-IN-WATER EMULSIONS

BACKGROUND OF THE INVENTION

In the processing of metals and in the cleaning of oily and greasy surfaces in the industrial sector, oil-in-water emulsions are frequently formed which must be broken and the oil removed before they are conducted into sewage plants or drainage ditches. The emulsions may be formed by the emulsifiers contained in lubricants, or the oils and fats emulsified by the surfactants contained in the cleaning solution. In cleaning solutions, the emulsions are also broken in order to regenerate them and to prolong their service life.

For degreasing and cleaning of metallic surfaces, particularly in the industrial sector, aqueous solutions which contain tensides and alkali metal hydroxides, as well as builder substances, such as alkali metal carbonates, alkali metal silicates, alkali metal phosphates, alkali metal borates, and also sequestrants, such as phosphonic acids, polyhydroxycarboxylic acids, amino-and polyaminopolycarboxylic acids and organic and/or inorganic corrosion preventives or any combination may be used.

The solution may be neutral to strongly alkaline. As surfacants, the cleaning solutions contain anionic or nonionic tensides and sometimes both. These cleaning solutions are contaminated by petroleum oil or fixed oils and sometimes both and in which emulsifiers, corrosion preventives and other oil additives have been added. These contaminants which are emulsified by possibly emulsifiers contained in oil, and the tensides in the cleaning solution impair the effectiveness of the aqueous cleaning solution until finally it becomes ineffective. The solutions must then be replaced. Before these solutions are discharged they must be freed of oil in accordance with effluent waste disposal requirements. This generally requires breaking the oil-in-water emulsion. It is known that oil-in-water emulsions can be broken by reducing their pH-value to about 1; by salting out the solution; or by adding flocculants, like aluminim or iron salts in a solution in the acid range and neutralizing them again, thereby regenerating them. In order to reduce the emulsification of oil in degreasing solutions, it has also been suggested to use only non-ionic tensides with a turbidity point below 40 deg. C., or to heat the degreasing bath to a temperature above the turbidity point of the tensides in order to obtain oil separation. This method has the disadvantage that it requires a higher temperature of the solution. Besides, the method cannot be used effectively in practice in electrolyte-free solutions.

OBJECTS OF THE INVENTION

It is an object of the present invention to use as an emulsion breaker 2,4,7,9-tetramethyl-5-decyne-4,7-diol.

Another object of the invention is to provide a means for removing the oil phase from neutral or alkaline oil-in-water emulsions.

It is a further object of the invention to provide a means for regenerating industrial cleaning solutions contaminated with oil-in-water emulsions.

Another object is to provide a process for breaking oil-in-water emulsions which comprises adding an emulsion breaking effective amount of 2,4,7,9-tetramethyl-5-decyne-4,7-diol to an emulsion containing composition.

These and other objects of the invention will become more apparent as the description thereof proceeds.

The accompanying drawing shows an apparatus used to test the efficiency of emulsion breakers on oil-in-water emulsions.

DESCRIPTION OF THE INVENTION

It was found that tetramethyldecynediol is highly suitable for breaking oil-in-water emulsions. The process for so doing is characterized by adding 2,4,7,9-tetramethyl-5-decyne-4,7-diol to the oil-in-water emulsion to be broken in an amount of 0.5 to 50 g/l, preferably 0.5 to 5 g/l based on the volume of the emulsion containing composition. The oil-in-water emulsions contain anionic or nonionic tensides or emulsifiers or possibly all of them as well as inorganic or organic builders or both or sequestrants in some cases as well as corrosion preventives, alkali metal hydroxides and inhibitors or any combination thereof. Due to the addition of tetramethyldecynediol, the emulsions are broken rapidly and reliably. In the presence of anionic tensides, the residual oil content in the aqueous solution layer is also kept very low.

The breaking of the emulsion with tetramethyldecynediol can be effected in a neutral medium or a weakly alkaline or strongly alkaline medium without the necessity of neutralizing the solution. Furthermore, it is a particular advantage of the method according to the invention that it can be carried out at room temperature. If desired, however, it is also possible to work at temperatures of up to about 100 deg. C.

The regeneration method of the invention is suitable to use with neutral to strongly alkaline cleaning solutions which contain petroleum oils or fixed oils or both. In this case, the cleaning solution will be regenerated by separation of the oil-tetramethyldecynediol layer from the aqueous layer.

Portions of the cleaning solution which have been lost in the regeneration can be compensated for by the addition of water and replenishment of cleaning agents up to the desired concentration. The cleaning solution is then generally fully effective again. Only in specific cases is it necessary to replenish the tenside content. A variation of the pH value of the cleaning solution, which would cause an impairment of the cleaning action, does not take place in the regeneration. The regenerating process can be carried out repeatedly for the same cleaning solution after it has been contaminated again.

The following examples are given by way of illustration and not by way of limitation.

The percentages, unless stated otherwise, are percent by weight.

Emulsion breaking ability can be shown in a static test where the phase separations of an oil-in-water emulsion is determined by measuring the time it takes for this to occur. For a dynamic test of emulsion breaking ability, an apparatus, which is described in "Seifen-Oele-Fette-Wachse" 1978, p. 325 by Kindscher was used. Attention is again directed to the accompanying drawing. The apparatus serves to measure the separation of oil from circulating oil-in-water emulsions. In a 2.5 liter steel vessel (b) suspended in a thermostatically controlled bath (a), there is charged 2 liters of the temperature controlled 3% aqueous solution (hardness about 16°od.) of the particular agent to be tested. 50 ml of spindle oil were added from a dropping funnel within 1 minute with stirring using a propeller stirrer (c) at 300 rpm. The emulsion was stirred for another 5 minutes, before the actual measurement began.

By a hose pump (d) (pumping rate =25 l/h) the emulsion was returned into the emulsifying vessel (b) through the temperature-controlled, calibrated double-jacketed separating vessel (e) and a flow meter (f). By holding the emulsion in the separating vessel it was possible to separate the oil from the emulsion. The volume of the separated clear or turbid oil layer was recorded in % by volume, based on the circulation time of the emulsion.

EXAMPLE 1

In a static test, an emulsion phase separated at room temperature from an emulsion of 5 g/l mineral oil in a solution of 50 g/l sodium metasilicate and 1 g/l addition product of 14 moles ethylene oxide onto nonylphenol after standing for 2 hours. The aqueous lower layer which was still milky, contained 330 mg/l mineral oil. If 1 g/l tetramethyldecynediol is added to the same emulsion, a pure oil phase is separated on the solution surface. The aqueous bottom phase contained only 78 mg/l mineral oil after two hours.

EXAMPLE 2

In the static test, an emulsion phase separated at room temperature from an emulsion of 5 g/l mineral oil in a solution of 50 g/l sodium metasilicate and 1 g/l alkylbenzene sulfonate after standing for 2 hours. The still milky aqueous layer contained 173 mg/l mineral oil. If 1 g/l tetramethyldecynediol is added to an emulsion produced in the same manner, a pure oil layer is rapidly separated on the surface of the water layer. The clear aqueous solution contained only 31 mg/l mineral oil. In the Kindscher apparatus for evaluating the emulsification behavior under dynamic conditions, an emulsion phase of 7 ml separated at a temperature of 70° C. from an emulsion of 5 g/l mineral oil in a solution of 50 g/l sodium diphosphate and 1 g/l alkylbenzene sulfonate. If 1 to 4 g/l of an ethylene oxide/propylene oxide block polymer (90% propylene oxide, 10% ethylene oxide) were added to the emulsion, only a very small oil phase separated, in addition to an emulsion phase of 4 ml. But if 1 g/l tetramethyldecynediol is added, the emulsion was completely broken and an oil phase of 4 ml separated.

EXAMPLE 3

An emulsion of 5 g/l olive oil in an aqueous solution containing 50 g/l sodium metasilicate and 1 g/l of the addition product of 10 mols of ethylene oxide onto nonylphenol was placed in the Kindscher apparatus at a temperature of 70° C. After 30 minutes, an emulsion phase of 4 ml separated out. By adding 0.5 g/l tetramethyldecynediol a homogeneous oil phase of 2.5 ml and a tetramethyldecynediol phase of 0.5 ml separated out.

EXAMPLE 4

5 g/l petroleum oil were emulsified with a neutral, builder-free cleaning solution containing 1 g/l addition product of 11 moles ethylene oxide onto nonlyphenol and 1% triethanolamine caprylate as a corrosion preventive. No oil phase separated in the Kindscher apparatus at 30° C., only an emulsion phase. After the addition of 4 g/l tetramethyldecynediol, 80% of the petroleum oil separated. The cleaning solution could subsequently be used for another cleaning cycle and be regenerated in the same manner even after the addition of a further 5 g/l petroleum oil.

EXAMPLE 5

In an immersion-degreasing process for metal parts contaminated with petroleum oils, a degreasing composition of a 5% aqueous solution of 40% caustic soda, 25% sodium metasilicate, 5% sodium pyrophosphate, 25% sodium carbonate, and 2.5% alkylbenzene sulfonate, as well as 2.5% addition product of 14 moles ethylene oxide onto a fatty alcohol was employed. The petroleum separated from the metal parts were completely emulsified. After the addition of 1 g/l tetramethyldecynediol, and standing for 30 minutes, 85% of the petroleum oils separated and could be removed. Due to this approach the service life of the degreasing bath could be extended by a multiple.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for breaking oil-in-water emulsions which comprises adding an emulsion breaking effective amount of 2,4,7,9-tetramethyl-5-decyne-4,7-diol to an emulsion containing composition.

2. A process as set forth in claim 1, wherein the 2,4,7,9-tetramethyl-5-decyne-4,7,-diol is added at room temperature.

3. A process as set forth in claim 1 wherein the process is carried out at elevated temperatures.

4. A process as set forth in claim 1 or 2 or 3 wherein the 2,4,7,9-tetramethyl-5-decyne-4,7-diol is added in an amount of about 0.5 to 50 g/l of the emulsion containing composition.

5. A process as set forth in claim 4, wherein the 2,4,7,9-tetramethyl-5-decyne-4,7-diol is added in an amount of about 0.5 to 5 g/l.

6. A process as set forth in claim 1 or 2 or 3 wherein the emulsion containing composition includes neutral to strongly alkaline cleaning solutions, emulsified petroleum oils or fixed oils or both and fats, the emulsion is broken, the oil 2,4,7,9-tetramethyl-5-decyne-4,7-diol layer is separated and the cleaning solution reused.

7. A process as set forth in claim 6 wherein the separated, regenerated cleaning solution has its depleted components replenished before reuse.

8. A process for causing an oil-in-water emulsion to form separate, aqueous and oily phases which comprises adding from about 0.5 to 50 g/l of 2,4,7,9-tetramethyl-5-decyne-4,7-diol to an oil-in-water emulsion-containing composition.

9. A process for regenerating an oil-in-water emulsion-containing cleaning composition which comprises the steps of:
   (a) adding from 0.5 to 50 g/l of 2,4,7,9-tetramethyl-5-decyne-4,7-diol to an emulsion-containing composition comprising (i) neutral to strongly alkaline cleaning solution, (ii) emulsified petroleum oils, fixed oils, or both, and (iii) fats to form separate, aqueous and oily phases, said oily phase containing the 2,4,7,9-tetramethyl-5-decyne-4,7-diol;
   (b) separating the oily phase from the aqueous phase; and
   (c) replenishing depleted cleaning solution components in the aqueous phase.

* * * * *